United States Patent [19]

Cai et al.

[11] Patent Number: 5,612,444
[45] Date of Patent: Mar. 18, 1997

[54] PROCESS FOR MAKING POLYETHERESTERS WITH HIGH AROMATIC ESTER CONTENT

[75] Inventors: Gangfeng Cai, West Chester, Pa.; Lau S. Yang, Wilmington, Del.; Jeffrey A. Klang, Exton, Pa.

[73] Assignee: ARCO Chemical Technology, L.P., Greenville, Del.

[21] Appl. No.: 412,176

[22] Filed: Mar. 28, 1995

[51] Int. Cl.$^6$ .................................................. C08G 63/78
[52] U.S. Cl. ............................. 528/274; 522/1; 522/93; 522/102; 524/777; 524/783; 524/784; 524/785; 524/786; 524/845; 525/437; 528/176; 528/193; 528/194; 528/272; 528/275; 528/280; 528/281; 528/282; 528/283; 528/286; 528/306; 528/307
[58] Field of Search ...................... 528/176, 193, 528/194, 274, 272, 275, 280, 281, 282, 283, 286, 306, 307, 711, 773; 524/777, 783, 784, 785, 786, 845; 525/437; 522/1, 93, 102

[56] References Cited

U.S. PATENT DOCUMENTS

| | | | |
|---|---|---|---|
| 4,605,729 | 8/1986 | Barnes et al. | 528/301 |
| 5,436,314 | 7/1995 | Yang et al. | 528/274 |

*Primary Examiner*—Terressa Mosley
*Attorney, Agent, or Firm*—Jonathan L. Schuchardt

[57] ABSTRACT

A two-step process for making polyetherester resins is disclosed. A low molecular weight polyol reacts with an aromatic dicarboxylic acid in step one to produce a polyester intermediate. In step two, the polyester intermediate reacts with an anhydride or an aliphatic dicarboxylic acid in the presence of an insertion catalyst to produce a polyetherester resin that contains greater than about 10 wt. % of recurring units derived from the aromatic dicarboxylic acid. The polyetheresters are useful for making thermoset resins with excellent mechanical properties and chemical resistance.

22 Claims, No Drawings

PROCESS FOR MAKING POLYETHERESTERS WITH HIGH AROMATIC ESTER CONTENT

FIELD OF THE INVENTION

The invention relates to a process for making polyetheresters. In particular, the invention is a process for making polyetheresters that have a high content of aromatic ester recurring units.

BACKGROUND OF THE INVENTION

Recently, we described a new process for making polyetherester resins from polyethers (see U.S. Pat. No. 5,319,006). The process reacts a polyether with a cyclic anhydride (such as maleic anhydride) in the presence of a Lewis acid catalyst. The anhydride inserts randomly into carbon-oxygen bonds of the polyether to generate ester bonds in the resulting polyetherester resin. The polyetherester resin is then combined with a vinyl monomer, preferably styrene, and is cured to produce a polyetherester thermoset.

We later found that, in addition to Lewis acids, protic acids that have a pKa less than about 0 and metal salts thereof will catalyze the insertion of an anhydride into the polyether to produce a polyetherester (see copending application Ser. No. 08/220,149, filed Mar. 30, 1994). We also discovered that these strong protic acids and their metal salts will catalyze the insertion of a carboxylic acid into a polyether (see copending application Ser. No. 08/228,845, filed Apr. 18, 1994).

The ability to prepare polyetheresters by random insertion of anhydrides and carboxylic acids into polyethers provides a valuable way of making many unique polyetherester intermediates. These polyetheresters often have favorable performance characteristics compared with polyesters made by conventional esterification processes. Unfortunately, the insertion process does not work particularly well with high-melting aromatic dicarboxylic acids (such as isophthalic and terephthalic acids). Aromatic dicarboxylic acids are commonly incorporated into conventional unsaturated polyester resins to impart good mechanical properties and chemical resistance to thermosets made from the resins.

As we described in copending application Ser. No. 08/228,845, carboxylic acids, including aromatic dicarboxylic acids, can be inserted in one step into polyethers using strong protic acids or their metal salts as catalysts. Examples 2 and 5 of that application illustrate the insertion process with 20 wt. % isophthalic acid. The examples show that it is possible to make polyetheresters having high aromatic ester content by a single-step insertion process.

The single-step process illustrated by those examples has some disadvantages compared with the process of the invention when such high levels of aromatic dicarboxylic acids are used. First, relatively high catalyst levels (typically 1 wt. % or higher) are needed for the single-step insertion process to give satisfactory reaction rates. Second, the yield of polyetherester resin obtainable is somewhat less than desirable. Third, resin consistency is difficult to achieve with the single-step process. As the comparative examples (See C12–C14) in this application illustrate, the single-step insertion process may be too slow at desirable catalyst levels of less than about 0.5 wt. %. The reactions can be incomplete even after several days of heating at elevated temperature, and the products often become discolored.

Thus, while at least about 10 wt. % of aromatic dicarboxylic acid content is desirable in polyetheresters to give them good mechanical properties and chemical resistance, the single-step insertion process is not completely satisfactory for making these products.

Ordinary esterification procedures can be used to make polyetheresters. For example, one can react a low molecular weight polyol, a glycol, maleic anhydride, and isophthalic acid in a single-step cook to make a polyetherester. Unfortunately, thermosets made from this type of product often lack the desirable physical and mechanical properties available from polyetheresters made by an insertion process. We believe that the relatively slow reactivity of isophthalic acid compared with that of maleic anhydride in the ordinary esterification process adversely impacts the product.

A valuable process would capitalize on the improved properties available from polyetheresters made by an insertion process, but would also facilitate the inclusion of more than about 10 wt. % of recurring units of an aromatic dicarboxylic acid in the polyetherester. Ideally, the process would be easy to perform at low catalyst levels, would give consistent resins, and would not require excessively long reaction times or high temperatures.

SUMMARY OF THE INVENTION

The invention is a two-step process for making polyetherester resins. First, a low molecular weight polyether polyol reacts with an aromatic dicarboxylic acid to produce a polyester intermediate. In step two, the polyester intermediate reacts with an anhydride or an aliphatic dicarboxylic acid in the presence of a catalyst effective to promote random insertion of the anhydride or dicarboxylic acid into polyether segments of the polyester intermediate. The resulting product is a polyetherester resin that contains greater than about 10 wt. % of recurring units derived from the aromatic dicarboxylic acid.

Although polyetheresters having at least about 10 wt. % of recurring units derived from an aromatic dicarboxylic acid are difficult to make by the single-step insertion process, we surprisingly found that they can be made easily, even at low catalyst levels, with the two-step process of the invention. The resulting polyetheresters, which contain up to about 25 wt. % of recurring units derived from the aromatic dicarboxylic acid, are useful for making thermoset resins with excellent mechanical properties and chemical resistance. The invention includes polyetherester and glycol-capped polyetherester resins made by the process of the invention. Also included are polyetherester thermosets made from the resins.

DETAILED DESCRIPTION OF THE INVENTION

The process of the invention is used to make polyetherester resins in two steps. In step one, a low molecular weight polyether polyol reacts with an aromatic dicarboxylic acid to produce a polyester intermediate.

By "low molecular weight polyether polyol" we mean polyether polyols having average hydroxyl functionalities from about 2 to about 8 and number average molecular weights less than about 2000. Preferred low molecular weight polyether polyols have average hydroxyl functionalities from about 2 to about 3, and number average molecular weights within the range of about 200 to about 1000. Suitable low molecular weight polyols include, for example, polyoxypropylene polyols, polyoxyethylene polyols, ethylene oxide-propylene oxide copolymers, polytetramethylene ether glycols, oxetane polyols, and copolymers of tetrahydrofuran and epoxides. Suitable low molecular weight polyols include polyalcohols such as tripropylene glycol, glycerin, propoxylated glycerin, trimethylolpropane, and the like.

Particularly preferred low molecular weight polyols are poly(oxypropylene) diols and triols. These are easily made according to well known methods by reacting a polyalcohol (glycerin, trimethylolpropane, propylene glycol, or the like) with propylene oxide in the presence of a basic catalyst.

An aromatic dicarboxylic acid reacts with the low molecular weight polyether polyol. Suitable aromatic dicarboxylic acids are those commonly used in the polyester industry. Aromatic dicarboxylic acids are typically high-melting solids. Examples include phthalic acid, isophthalic acid, terephthalic acid, and halogenated derivatives of these. Isophthalic acid is particularly preferred.

The relative proportions of aromatic dicarboxylic acid and low molecular weight polyether polyol are adjusted to provide up to about 2 moles of —COOH groups for each mole of —OH groups present. A preferred range is from about 0.5 to about 2 moles of —COOH groups per mole of —OH groups present.

The low molecular weight polyether polyol and aromatic dicarboxylic acid are reacted by heating them together, optionally in the presence of an esterification catalyst, under conditions effective to promote esterification of the polyol hydroxyl end groups. The reaction temperature is preferably within the range of about 150° C. to about 250° C.; a more preferred range is from about 180° C. to about 220° C. The reaction is normally complete within about 6 to 8 h at temperatures within the more preferred range. As the reaction proceeds, the reaction mixture usually turns from opaque to clear as the aromatic dicarboxylic acid melts or dissolves and reacts with the polyether polyol.

If desired, an esterification catalyst is included. Suitable esterification catalysts will promote reaction of polyol hydroxyl end groups with aromatic dicarboxylic acids to produce polyols capped with aromatic dicarboxylic acids. Suitable esterification catalysts include, for example, organic sulfonic acids such as p-toluenesulfonic acid. Often, an esterification catalyst is omitted.

The product from step one is a polyester intermediate. The polyester intermediate will typically have mostly aromatic acid terminal groups. The progress of the reaction is normally followed simply by observing the transition from an opaque to a clear reaction mixture. If desired, however, one can monitor the acid number of the reaction mixture and proceed to step two when the acid number reaches a targeted value.

In step two, the polyester intermediate reacts with an anhydride or an aliphatic dicarboxylic acid in the presence of a catalyst effective to promote random insertion of the anhydride or dicarboxylic acid into polyether segments of the polyester intermediate (an "insertion catalyst"). The resulting product is a polyetherester resin that contains greater than about 10 wt. % of recurring units derived from the aromatic dicarboxylic acid.

Anhydrides suitable for use are cyclic anhydrides. Saturated anhydrides, unsaturated anhydrides, or mixtures thereof can be used. If the resin is to be used for making a thermoset polyetherester resin, then at least a portion—and preferably most—of the anhydride must be unsaturated. Unsaturated anhydrides contain ethylenic unsaturation. Suitable unsaturated anhydrides include, for example, maleic anhydride, citraconic anhydride, itaconic anhydride, halogenated unsaturated anhydrides, and the like, and mixtures thereof. Maleic anhydride is particularly preferred. Suitable saturated anhydrides (which contain no reactive ethylenic unsaturation) include, for example, succinic anhydride, alkyl-substituted succinic anhydrides, phthalic anhydride, and the like, and mixtures thereof. Polyetheresters prepared using only saturated anhydrides are particularly useful as polyester polyol intermediates for polyurethanes.

Aliphatic dicarboxylic acids useful in the invention include linear, branched, and cycloaliphatic saturated and unsaturated compounds that contain two —COOH groups. Preferred dicarboxylic acids are $C_3$–$C_{40}$ aliphatic dicarboxylic acids. Suitable dicarboxylic acids include, for example, adipic acid, suberic acid, malonic acid, azelaic acid, sebacic acid, maleic acid, fumaric acid, citraconic acid, glutaric acid, succinic acid, 1,4-cyclohexanedicarboxylic acid, and the like, and mixtures thereof. Saturated $C_4$–$C_{20}$ aliphatic dicarboxylic acids are particularly preferred.

The polyester intermediate reacts with the anhydride or aliphatic dicarboxylic acid in the presence of a catalyst that promotes random insertion of the anhydride or dicarboxylic acid into polyether segments of the polyester intermediate (an "insertion catalyst"). Suitable insertion catalysts include Lewis acids, protic acids that have a pKa less than about 0, and metal salts of the protic acids. The insertion catalyst is used in an amount effective to promote random insertion of either the anhydride or the aliphatic dicarboxylic acid into polyether carbon-oxygen bonds of the polyester intermediate.

Preferred Lewis acids are metal halides of the formula $MX_n$, wherein M is a metal having an oxidation number from 2 to 4, X is a halogen, and n is an integer from 2 to 4. Examples of suitable Lewis acids are zinc chloride, zinc bromide, stannous chloride, stannous bromide, aluminum chloride, ferric chloride, boron trifluoride, and the like, and mixtures thereof. Most preferred are zinc chloride and zinc bromide. When a Lewis acid catalyst is used, it is preferred to use an amount within the range of about 0.01 to about 5 wt. % based on the amount of polyester intermediate. Additional examples of suitable Lewis acids are found in U.S. Pat. No. 5,319,006, the teachings of which are incorporated herein by reference.

Protic acids (organic and inorganic) that have a pKa less than about 0 are also useful as insertion catalysts. Generally, the acids will be stronger than organic carboxylic acids. Suitable acids include arylsulfonic acids, alkylsulfonic acids, and halogenated alkyl- and arylsulfonic acids. Also suitable are hydrogen halides, halosulfonic acids, tetrafluoroboric acid, heteropolyacids, and sulfuric acid. Mixtures of different acids can be used. Examples include p-toluenesulfonic acid, trifluoromethanesulfonic acid (triflic acid), trichloromethanesulfonic acid, hydrochloric acid, phosphotungstic acid, and the like. Preferred protic acids are sulfuric acid, p-toluenesulfonic acid, and phosphotungstic acid. When a protic acid is used as the catalyst, it is generally preferred to use an amount within the range of about 0.01 to about 1 wt. % based on the amount of polyester intermediate. A more preferred range is from about 0.01 to about 0.3 wt. %. Additional examples of suitable protic acids are found in application Ser. No. 08/220,149, filed Mar. 30, 1994, now allowed, the teachings of which are incorporated herein by reference.

Metal salts derived from protic acids that have a pKa less than about 0 are also effective insertion catalysts. Preferred salts are metal salts of arylsulfonic acids, alkylsulfonic acids, halogenated aryl- and alkylsulfonic acids, tetrafluoroboric acid, sulfuric acid, heteropolyacids, and halosulfonic acids. Sulfonic acid salts, especially triflate salts, are particularly preferred. Preferably, the metal is selected from Group IA, IIA, IIB, IB, IIIA, IVA, VA, and VIII. Thus, the metal can be, for example, lithium, potassium, magnesium, zinc, copper, aluminum, tin, antimony, iron, nickel. Examples of suitable metal salts are lithium triflate, sodium triflate, magnesium triflate, zinc triflate, copper(II) triflate, zinc tetrafluoroborate, zinc p-toluenesulfonate, aluminum triflate, iron(II) tetrafluoroborate, tin(II) triflate, and the like, and mixtures thereof. When a metal salt is used as the catalyst, it is preferably used in an amount within the range of about 1 part per million ($10^{-4}$ wt. %) to about 1 wt. % based on the amount of polyester intermediate. A more preferred range is from about 0.01 wt. % to about 0.3 wt. %. Additional examples of suitable metal salts of protic acids are found in application Ser. No. 08/220,149, filed Mar. 30, 1994, now allowed, the teachings of which are incorporated herein by reference.

The polyester intermediate and anhydride or aliphatic dicarboxylic acid are reacted by heating them together in the presence of the insertion catalyst under conditions effective to promote insertion of the anhydride or aliphatic dicarboxylic acid into polyether segments of the polyester intermediate. The reaction temperature is preferably within the range of about 80° C. to about 250° C.; a more preferred range is from about 100° C. to about 220° C. The reaction is normally complete within about 8 h at temperatures within the more preferred range.

The resulting product is a polyetherester resin that contains greater than about 10 wt. % of recurring units derived from the aromatic dicarboxylic acid. The polyetherester resin preferably contains from about 10 to about 25 wt. % of recurring units derived from the aromatic dicarboxylic acid; most preferred is the range from about 15 to about 25 wt. %.

Heating continues to produce a polyetherester resin that preferably has an acid number within the range of about 75 to about 200 mg KOH/g; a more preferred range is from about 90 to about 150 mg KOH/g; most preferred is the range from about 110 to about 130 mg KOH/g.

The polyetherester resin prepared as described above commonly has a large proportion of carboxylic acid end groups. This resin can be used "as is" to make a polyetherester thermoset. Preferably, it is modified in one of two ways before using it to make a polyetherester or polyurethane. One way to modify the resin is to continue heating it to further react the polymer and reduce its acid number, preferably to about 60 mg KOH/g or less. This method is generally the less desirable of the two because excessive heating and prolonged reaction times are needed to achieve a resin having a low enough acid number. The second and more preferred method, which is described further below, is to reduce the acid number by heating the polyetherester resin in the presence of a glycol.

The polyetherester resin having an acid number within the range of about 75 to about 200 mg KOH/g is preferably heated with a glycol to produce a glycol-capped polyetherester resin that has a reduced acid number. Suitable glycols have molecular weights less than about 200. Suitable glycols include, for example, propylene glycol, ethylene glycol, diethylene glycol, dipropylene glycol, tripropylene glycol, 1,4-butanediol, 1,3-propanediol, 2-methyl-1,3-propanediol, neopentyl glycol, and the like, and mixtures thereof. Particularly preferred are propylene glycol, neopentyl glycol, and 2-methyl-1,3-propanediol.

The amount of glycol used is preferably at least about 1 equivalent of glycol for each residual carboxylic acid end group. Typically, this amounts to heating the polyetherester resin with at least about 5–20 wt. % of the glycol. The glycol is typically heated with the polyetherester resin at the same temperature as that used for the insertion reaction until the acid number of the glycol-capped polyetherester resin drops to the desired level. Any excess glycol is removed by stripping.

The polyetherester resin is preferably heated in the presence of the glycol to produce a glycol-capped polyetherester resin that has an acid number within the range of about 30 to about 90 mg KOH/g; a more preferred range is from about 40 to about 60 mg KOH/g.

Polyetherester resins and glycol-capped polyetherester resins of the invention that contain some ethylenic unsaturation are useful for preparing polyetherester thermosets. The thermoset is made by reacting a resin of the invention with a vinyl monomer in the presence of a free-radical initiator under conditions effective to produce a polyetherester thermoset. The techniques are essentially the same as those used in the polyester industry to prepare unsaturated polyester thermosets from unsaturated polyester resins.

A vinyl monomer is used to make the polyetherester thermosets of the invention. Preferred vinyl monomers are vinyl aromatic monomers, acrylates, methacrylates, and allyl esters. Suitable vinyl monomers include, for example, styrene, methyl methacrylate, methyl acrylate, diallyl phthalate, divinylbenzene, α-methylstyrene, and the like, and mixtures thereof. Styrene is particularly preferred.

The polyetherester resins are often blended with a vinyl monomer (typically styrene) and an inhibitor such as hydroquinone, tert-butylcatechol, or the like, or mixtures thereof, and the solution is stored until needed.

The polyetherester resin solution can be used to make a clear casting by combining it with a free-radical initiator, preferably a peroxide such as benzoyl peroxide, tert-butylperbenzoate, or the like, pouring the mixture into a mold, and heating it to effect a cure. If desired, other additives can be included in the thermosets, including, for example, fillers, pigments, chopped glass, glass mat, low-profile additives, flame retardants, and the like.

The process of the invention offers significant advantages. While polyetheresters having at least about 10 wt. % of recurring units derived from an aromatic dicarboxylic acid are difficult to make by a single-step insertion process, they can be easily made by the two-step process of the invention. The process of the invention gives complete reactions using low catalyst levels in a matter of hours; the insertion-only process is often incomplete days later. In addition, the process gives polyetherester resins of consistent quality.

The polyetherester products made by the process of the invention exhibit good mechanical properties and chemical resistance, as might be expected of isophthalate polyesters. (Compare Examples 1–4 with Comparative Example 5). Surprisingly, however, thermoset resins made from the polyetheresters of the invention outperform those made from polyetheresters made using only an esterification process. (Compare Examples 1–3 with Comparative Examples 6–8). In particular, the tensile strengths of the thermosets made from the polyetherester resins of the invention far exceed those of thermosets made from polyetheresters made by a one-step esterification procedure, particularly in the 15–20 wt. % isophthalic acid range. These results highlight the advantage of using a polyetherester resin made at least in part by an insertion process.

As Comparative Examples 12–14 show, however, an insertion process alone is not satisfactory. Attempted preparation of a polyetherester resin by an insertion process alone using 0.3–0.5 wt. % p-toluenesulfonic acid catalyst and from 15–20 wt. % of isophthalic acid is not successful. Even after about 20 hours at 185°–195° C., much of the isophthalic acid remains unreacted. On the other hand, use of the two-step process of the invention facilitates the preparation of a product containing 20 wt. % or more of recurring units derived from isophthalic acid (see Examples 1, 10, and 11).

The following examples merely illustrate the invention. Those skilled in the art will recognize many variations that are within the spirit of the invention and scope of the claims.

EXAMPLE 1

Preparation of a Polyetherester Resin by Esterification/Insertion and Preparation of a Polyetherester Thermoset from the Resin.

A two-liter resin kettle is charged with a 400 mol. wt. poly(oxypropylene) diol (900 g), isophthalic acid (300 g, 20%), and p-toluenesulfonic acid (1.5 g). The mixture is heated to 195° C. and is maintained at that temperature for 6 h or until the mixture becomes clear. Maleic anhydride (300 g, 20%) is added, and the mixture is heated at 185° C. Heating continues until the acid number drops to 120 mg KOH/g. Propylene glycol (180 g) is added, and heating continues. About 4 h after the glycol is added, the acid number of the resin drops to 55 mg KOH/g. The product is allowed to cool to about 120° C. and 100 ppm of hydroquinone is added. The resin (60 wt. %) is then blended with styrene (40 wt. %) that contains methylhydroquinone (100 ppm) and tert-butylcatechol (50 ppm) inhibitors.

The polyetherester resin solution is used to make a clear casting as follows. Benzoyl peroxide (1.3 wt. %) and tert-butylperbenzoate (0.3 wt. %) are combined with the resin/styrene solution. The mixture is poured into a mold, and is heated at 55° C. overnight, then at 75° C. for 2 h, at 105° C. for 2 h, and finally at 135° C. for 2 h. The product is a polyetherester thermoset that has the properties shown in Table 1.

EXAMPLES 2–4

Preparation of Polyetherester Resins by Esterification/Insertion and Preparation of Polyetherester Thermosets from the Resins.

The procedure of Example 1 is followed to make additional polyetherester resins by the two-step esterification/insertion process of the invention. The amounts of maleic anhydride and isophthalic acid used to make the resins is varied as indicated in Table 1. The resins are cured with styrene to make polyetherester thermosets. Properties of the polyetherester thermosets are shown in Table 1.

Comparative Example 5

The procedure of Example 1 is generally followed, except that isophthalic acid is omitted from the formulation. The polyether diol is simply heated at 185° C. with maleic anhydride (300 g, 20%). The resin is cured with styrene as described in Example 1. The properties of the polyetherester thermoset appear in Table 1.

This example illustrates that thermosets having much higher tensile and flexural strengths are available by including isophthalic acid recurring units in the polyetherester resin.

Preparation of Polyetherester Resins by Esterification Only (Comparative Examples 6–8)

Comparative Example 6

A two-liter resin kettle is charged with a polyoxypropylene diol of about 400 mol. wt. (649 g), isophthalic acid (320 g), maleic anhydride (320 g), and propylene glycol (311 g). The mixture is heated to 195° C. and is held at that temperature until more than 95% of the water of reaction is collected or until the acid number drops to 60 mg KOH/g or less (24–35 h). The mixture is heated at 195° C. under vacuum (20–50 mm Hg) until the acid number drops to less than 40 mg KOH/g. The product is cooled to about 120° C., and hydroquinone (100 ppm) is added. The resin is then blended 60/40 (wt/wt) with styrene that contains methylhydroquinone (100 ppm) and tert-butylcatechol (50 ppm) as inhibitors. The resin solution is used to make a clear thermoset casting as described in Example 1. Physical properties of the casting appear in Table 1.

Comparative Example 7

The procedure of Comparative Example 6 is used to make a polyetherester resin by esterification only that contains 15% isophthalic acid and 20% maleic anhydride recurring units. The amounts of reagents are adjusted as follows: polyoxypropylene diol of about 400 mol. wt. (797 g); isophthalic acid (240 g); maleic anhydride (320 g); propylene glycol (243 g). The resin solution is used to make a clear thermoset casting as described in Example 1. Physical properties of the casting appear in Table 1.

Comparative Example 8

The procedure of Comparative Example 6 is used to make a polyetherester resin by esterification only that contains 10% isophthalic acid and 20% maleic anhydride recurring units. The amounts of reagents are adjusted as follows: polyoxypropylene diol of about 400 mol. wt. (946 g); isophthalic acid (160 g); maleic anhydride (320 g); propylene glycol (174 g). The resin solution is used to make a clear thermoset casting as described in Example 1. Physical properties of the casting appear in Table 1.

EXAMPLES 9–11

Preparation of Polyetherester Resins by Esterification/Insertion and Preparation of Polyetherester Thermosets from the Resins.

The procedure of Example 1 is followed to make polyetherester resins from 15–25 wt. % isophthalic acid (see Table 2). The resins (60 wt. %) are then blended with styrene (40 wt. %) that contains methylhydroquinone (100 ppm) and tert-butylcatechol (50 ppm) inhibitors.

Each polyetherester resin solution is used to make a clear casting as follows. The resin solution is mixed with cobalt naphthenate (0.2–0.5 wt. %) and methyl ethyl ketone peroxide (1–1.5 wt. %). The solution is poured into a mold, and is cured at room temperature overnight. The product is post-cured by heating it further at 100° C. for 5 h. The product is a polyetherester thermoset that has the properties shown in Table 2.

Comparative Example 12

Attempted Preparation of a 20% Isophthalic Acid/20% Maleic Anhydride Polyetherester Resin by an Insertion Process Only A 3000 mol. wt. poly(oxypropylene) triol (900 g), maleic anhydride (300 g), and isophthalic acid (300 g), and p-toluenesulfonic acid (3.0 g) are charged to a two-liter resin kettle, and the mixture is heated at 195° C. for 6 h. More p-toluenesulfonic acid (3.0 g) is added, and the mixture is heated at 195° C. for 16 more hours. The reaction mixture became dark and was still cloudy because much of the isophthalic acid had not reacted. The reaction was aborted.

Comparative Example 13

Attempted Preparation of a 20% Isophthalic Acid Polyetherester Resin by an Insertion Process Only A two-liter resin kettle is charged with a polyoxypropylene diol (2000 mol. wt., 1400 g), isophthalic acid (351 g), and p-toluenesulfonic acid (8.9 g). The mixture is heated to 185° C. with vigorous stirring. After approximately 18 h of heating, the mixture still contains much unreacted isophthalic acid, which is present as a white solid. At this point, the mixture darkens significantly. Within a few hours it becomes dark brown and is discarded.

Comparative Example 14

Attempted Preparation of a 15% Isophthalic Acid Polyetherester Resin by an Insertion Process Only A three-liter resin kettle is charged with a 3000 mol. wt. polyoxypropylene triol (1934 g), isophthalic acid (342 g), and p-toluenesulfonic acid (6.8 g). The mixture is heated to 185° C. with vigorous stirring. After 18.5 h of heating, the acid number of the still-cloudy mixture falls to 45 mg KOH/g. Propylene glycol (70 g) is added, and heating continues for another 5 h. The reaction mixture discolors, so heating is stopped, although solid is still present. Proton NMR analysis shows that the solid is unreacted isophthalic acid.

Comparative Examples 12–14 show that polyetherester resins that contain about 15–20 wt. % of recurring units derived from isophthalic acid are not easily made by single-step insertion of isophthalic acid into a polyether polyol at desirable catalyst levels of 0.1–0.5 wt. %. On the other hand, these products are readily made by the two-step esterification/insertion process of the invention.

TABLE 1

Properties of Polyetherester Thermosets:
Isophthalate Polyetherester Resins (40 wt. % Styrene)

| Ex. # | IPA/MA (wt. %) | Tensile strength (psi) | Elongation at break (%) | Tensile modulus (ksi) | Flexural strength (psi) | Flexural modulus (ksi) |
|---|---|---|---|---|---|---|
| 1 | 20/20 | 9200 | 3.0 | 450 | 13800 | 495 |
| 2 | 15/20 | 5700 | 8.1 | 351 | 13300 | 376 |
| 3 | 10/20 | 3250 | 25 | 215 | 7800 | 231 |
| 4 | 15/25 | 9800 | 3.0 | 470 | 17300 | 514 |
| C5 | 0/20 | 1970 | 41 | 58 | 2340 | 74 |
| C6 | 20/20 | 5100 | 10 | 307 | 11500 | 313 |
| C7 | 15/20 | 4345 | 11 | 266 | 8950 | 255 |
| C8 | 10/20 | 3410 | 20 | 207 | 7180 | 211 |

IPA = isophthalic acid;
MA = maleic anhydride.
Clear castings are made by mixing the polyetherester resin/styrene solutions with benzoyl peroxide (1.3 wt. %) and tert-butylperbenzoate (0.3 wt. %). The mixture is poured into a mold, and is heated at 55° C. overnight, then at 75° C. for 2 h, at 105° C. for 2 h, and finally at 135° C. for 2 h.
Tensile and flex properties are measured using standard ASTM methods D-638 and D-790.

TABLE 2

Properties of Polyetherester Thermosets:
Isophthalate Polyetherester Resins (40 wt. % Styrene)

| Ex. # | IPA/MA (wt. %) | Tensile strength (psi) | Elongation at break (%) | Tensile modulus (ksi) | Flexural strength (psi) | Flexural modulus (ksi) |
|---|---|---|---|---|---|---|
| 9 | 15/30 | 10540 | 3.8 | 491 | 19750 | 524 |
| 10 | 20/25 | 8470 | 2.3 | 525 | 19430 | 509 |
| 11 | 25/20 | 6300 | 7.6 | 414 | 16640 | 461 |

IPA = isophthalic acid;
MA = maleic anhydride.
Clear castings are made by mixing the polyetherester resin/styrene solution with cobalt naphthenate (0.2–0.5 wt. %) and methyl ethyl ketone peroxide (1–1.5 wt. %). The solution is poured into a mold, and is cured at room temperature overnight. The product is post-cured by heating it further at 100° C. for 5 h.
Tensile and flex properties are measured using standard ASTM methods D-638 and D-790.

The preceding examples are meant only as illustrations; the following claims define the invention.

We claim:

1. A process which comprises:

(a) heating a low molecular weight polyether polyol having an average hydroxyl functionality from about 2 to about 8 and a number average molecular weight less than about 2000 with an aromatic dicarboxylic acid under conditions effective to promote esterification of the polyol hydroxyl end groups to produce a polyester intermediate, wherein the relative proportions of aromatic dicarboxylic acid and low molecular weight polyol are adjusted to provide up to about 2 moles of —COOH groups for each mole of —OH groups present; and (b) heating the polyester intermediate with an anhydride or an aliphatic dicarboxylic acid in the presence of a catalyst under conditions effective to promote random insertion of the anhydride or aliphatic dicarboxylic acid into polyether segments of the polyester intermediate to produce a polyetherester resin that contains greater than about 10 wt. % of recurring units derived from the aromatic dicarboxylic acid.

2. The process of claim 1 wherein the aromatic dicarboxylic acid is selected from the group consisting of isophthalic acid, phthalic acid, and terephthalic acid.

3. The process of claim 1 wherein the low molecular weight polyether polyol has an average hydroxyl functionality from 2 to 3, and a number average molecular weight within the range of about 200 to about 1000.

4. The process of claim 1 wherein the polyetherester resin has an acid number within the range of about 75 to about 200 mg KOH/g.

5. The process of claim 1 wherein the polyetherester resin is further reacted with a glycol to produce a glycol-capped polyetherester resin.

6. The process of claim 5 wherein the glycol-capped polyetherester resin has an acid number within the range of about 30 to about 90 mg KOH/g.

7. The process of claim 1 wherein the anhydride is maleic anhydride.

8. The process of claim 1 wherein the aliphatic dicarboxylic acid is adipic acid.

9. The process of claim 1 wherein the catalyst is selected from the group consisting of Lewis acids, protic acids that have a pKa less than about 0, and metal salts of the protic acids.

10. The process of claim 1 wherein the polyetherester resin has at least about 20 wt. % of recurring units derived from the aromatic dicarboxylic acid.

11. The process of claim 1 which further comprises reacting the polyetherester resin with a vinyl monomer in the presence of a free-radical initiator to produce a polyetherester thermoset.

12. The process of claim 5 which further comprises reacting the glycol-capped polyetherester resin with a vinyl monomer in the presence of a free-radical initiator to produce a polyetherester thermoset.

13. The process of claim 12 wherein the vinyl monomer is styrene.

14. A process which comprises:

(a) heating a low molecular weight polyether polyol having an average hydroxyl functionality from 2 to 3, and a number average molecular weight within the range of about 200 to about 1000 with an aromatic dicarboxylic acid selected from the group consisting of isophthalic acid, phthalic acid, and terephthalic acid under conditions effective to promote esterification of the polyol hydroxyl end groups to produce a polyester intermediate, wherein the relative proportions of aromatic dicarboxylic acid and low molecular weight polyol are adjusted to provide up to about 2 moles of —COOH groups for each mole of —OH groups present;

(b) heating the polyester intermediate with an anhydride or an aliphatic dicarboxylic acid in the presence of a catalyst selected from the group consisting of Lewis acids, protic acids that have a pKa less than about 0, and metal salts of the protic acids, under conditions effective to promote random insertion of the anhydride or aliphatic dicarboxylic acid into polyether segments of the polyester intermediate to produce a polyetherester resin that contains greater than about 10 wt. % of recurring units derived from the aromatic dicarboxylic acid; and (c) heating the polyetherester resin with a glycol having a molecular weight less than about 200 to produce a glycol-capped polyetherester resin.

15. The process of claim 14 wherein the glycol-capped polyetherester resin has an acid number within the range of about 30 to about 90 mg KOH/g.

16. The process of claim 14 wherein the anhydride is maleic anhydride.

17. The process of claim 14 wherein the glycol-capped polyetherester resin has at least about 20 wt. % of recurring units derived from the aromatic dicarboxylic acid.

18. The process of claim 14 which further comprises reacting the glycol-capped polyetherester resin with a vinyl monomer in the presence of a free-radical initiator to produce a polyetherester thermoset.

19. The process of claim 18 wherein the vinyl monomer is styrene.

20. A process which comprises:

(a) heating a low molecular weight polyether polyol having an average hydroxyl functionality from 2 to 3, and a number average molecular weight within the range of about 200 to about 1000 with isophthalic acid under conditions effective to promote esterification of the polyol hydroxyl end groups to produce a polyester intermediate, wherein the relative proportions of isophthalic acid and low molecular weight polyol are adjusted to provide up to about 2 moles of —COOH groups for each mole of —OH groups present;

(b) heating the polyester intermediate with an anhydride or an aliphatic dicarboxylic acid in the presence of a catalyst selected from the group consisting of Lewis acids, protic acids that have a pKa less than about 0, and metal salts of the protic acids, under conditions effective to promote random insertion of the anhydride or aliphatic dicarboxylic acid into polyether segments of the polyester intermediate to produce a polyetherester resin that contains greater than about 10 wt. % of recurring units derived from isophthalic acid; and (c) heating the polyetherester resin with a glycol having a molecular weight less than about 200 to produce a glycol-capped polyetherester resin having an acid number within the range of about 30 to about 90 mg KOH/g.

21. The process of claim 20 wherein the glycol-capped polyetherester resin has at least about 20 wt. % of recurring units derived from isophthalic acid.

22. The process of claim 20 which further comprises reacting the glycol-capped polyetherester resin with styrene in the presence of a free-radical initiator to produce a polyetherester thermoset.

* * * * *